United States Patent
Claussen et al.

(10) Patent No.: US 11,673,561 B2
(45) Date of Patent: Jun. 13, 2023

(54) VEHICLE CONTROL SYSTEM

(71) Applicant: Transportation IP Holdings, LLC, Norwalk, CT (US)

(72) Inventors: Christopher Claussen, Cedar Rapids, IA (US); Jeffrey D. Kernwein, Cedar Rapids, IA (US); Joseph Gorman, Cedar Rapids, IA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 180 days.

(21) Appl. No.: 16/674,158

(22) Filed: Nov. 5, 2019

(65) Prior Publication Data

US 2021/0134081 A1    May 6, 2021

(51) Int. Cl.
| | | |
|---|---|---|
| *B60W 50/00* | (2006.01) | |
| *B60W 30/18* | (2012.01) | |
| *G07C 5/00* | (2006.01) | |
| *B61L 27/40* | (2022.01) | |

(52) U.S. Cl.
CPC ...... *B60W 50/00* (2013.01); *B60W 30/18163* (2013.01); *B61L 27/40* (2022.01); *G07C 5/006* (2013.01); *G07C 5/008* (2013.01); *B60W 2050/0075* (2013.01); *B60W 2420/42* (2013.01); *B60W 2556/45* (2020.02)

(58) Field of Classification Search
None
See application file for complete search history.

(56) References Cited

U.S. PATENT DOCUMENTS

| | | | | |
|---|---|---|---|---|
| 4,302,811 A | | 11/1981 | McElhenny | |
| 4,659,043 A | * | 4/1987 | Gallagher | B61K 9/06 246/169 A |
| 5,806,011 A | * | 9/1998 | Azzaro | F01P 11/16 123/339.24 |
| 6,476,722 B1 | * | 11/2002 | Bidone | G08B 17/06 340/578 |
| 6,985,803 B2 | * | 1/2006 | Abdel-Malek | B61K 9/00 246/122 R |
| 7,278,305 B2 | | 10/2007 | Kilian et al. | |
| 7,478,570 B2 | | 1/2009 | Mian et al. | |
| 7,564,569 B2 | | 7/2009 | Mian et al. | |
| 7,714,886 B2 | | 5/2010 | Kilian et al. | |

(Continued)

FOREIGN PATENT DOCUMENTS

| | | |
|---|---|---|
| AU | 2015261670 | 12/2015 |
| AU | 2015347772 | 6/2017 |
| EP | 1600351 | 1/2007 |

*Primary Examiner* — Timothy Hannon
(74) *Attorney, Agent, or Firm* — The Small Patent Law Group LLC; Joseph M. Butscher

(57) ABSTRACT

A vehicle control system receives a proximity signal at a sensor assembly from a vehicle system. The proximity signal indicates that the vehicle system is approaching a location of the sensor assembly. A sensor of the sensor assembly is activated responsive to receiving the proximity signal. One or more characteristics of the vehicle system are sensed as the vehicle system moves by the sensor assembly. A sensor signal that represents the one or more characteristics of the vehicle system is communicated to an onboard controller of the vehicle system and/or an off-board system to control operation of the vehicle system based on the one or more characteristics of the vehicle system.

30 Claims, 3 Drawing Sheets

(56) References Cited

U.S. PATENT DOCUMENTS

| | | |
|---|---|---|
| 8,006,559 B2 | 8/2011 | Mian et al. |
| 8,224,510 B2 | 7/2012 | Daum et al. |
| 8,245,983 B2 | 8/2012 | Gilbertson |
| 8,289,526 B2 | 10/2012 | Kilian |
| 8,326,582 B2 * | 12/2012 | Mian .................... G01N 29/041 702/190 |
| 8,335,606 B2 * | 12/2012 | Mian ........................ B61L 1/20 701/29.1 |
| 8,478,480 B2 * | 7/2013 | Mian .................. G01M 17/013 701/31.4 |
| 8,818,585 B2 | 8/2014 | Bartonek et al. |
| 8,925,873 B2 * | 1/2015 | Gamache ................. B61K 9/12 246/169 R |
| 10,160,117 B2 | 12/2018 | Mian et al. |
| 10,435,052 B2 | 10/2019 | Mesher |
| 10,866,195 B2 | 12/2020 | Iler |
| 11,208,129 B2 | 12/2021 | Kumar et al. |
| 2004/0093196 A1 * | 5/2004 | Hawthorne ......... B61L 15/0072 703/8 |
| 2006/0076461 A1 | 4/2006 | DeRose et al. |
| 2006/0180760 A1 * | 8/2006 | Lane ....................... G01J 5/026 250/339.05 |
| 2007/0075192 A1 * | 4/2007 | Mian ....................... G01B 5/06 246/1 R |
| 2010/0258682 A1 | 10/2010 | Fries et al. |
| 2015/0344048 A1 * | 12/2015 | Kernwein ............... B61L 3/125 701/19 |
| 2019/0002002 A9 | 1/2019 | Fahmy et al. |
| 2019/0095725 A1 * | 3/2019 | Kalghatgi ........... G06K 9/00805 |
| 2019/0176862 A1 * | 6/2019 | Kumar ............... G06K 9/00651 |
| 2020/0408682 A1 | 12/2020 | Mian et al. |

* cited by examiner

VEHICLE CONTROL SYSTEM

BACKGROUND

Technical Field

The subject matter described relates to systems and methods that monitor vehicle systems to control operation of the vehicle systems.

Discussion of Art

Some transportation networks include stationary wayside sensors that measure characteristics of passing vehicle systems. For example, hot box detectors and flat wheel detectors may measure temperatures of axles and/or identify flat spots on wheels of rail vehicles as the rail vehicles move by the detectors. If the detectors measure an elevated axle temperature or flat spot on the wheel of a passing rail vehicle, then the detectors can send a radio signal to the rail vehicle. This radio signal can be received and heard by one or more operators onboard the rail vehicle.

But, if the radio signal is not received, if the radio signal is not heard by an operator onboard the rail vehicle, or if the operator fails to act in response to hearing the radio signal, then the rail vehicle may continue moving in spite of the need for inspection or repair (due to the measured temperature or flat spot). This can pose a safety risk if the rail vehicle continues traveling.

BRIEF DESCRIPTION

In one embodiment, a method (e.g., for controlling a vehicle system) is provided that includes receiving a proximity signal at a sensor assembly from the vehicle system. The proximity signal indicates that the vehicle system is approaching a location of the sensor assembly. The method also includes activating a sensor of the sensor assembly responsive to receiving the proximity signal, sensing one or more characteristics of the vehicle system as the vehicle system moves by the sensor assembly, and communicating a sensor signal that represents the one or more characteristics of the vehicle system that are sensed. The sensor signal is communicated to one or more of an onboard controller of the vehicle system and/or an off-board system to control operation of the vehicle system based on the one or more characteristics of the vehicle system.

In one embodiment, a system (e.g., a vehicle control system) includes a controller configured to be disposed onboard a vehicle system and to receive one or more characteristics of the vehicle system from a sensor assembly. The sensor assembly is configured to sense the one or more characteristics of the vehicle system as the vehicle system approaches a location of the vehicle system. The controller is configured to control operation of the vehicle system based on one or more characteristics of the vehicle system.

In one embodiment, a sensor assembly includes a communication device configured to receive a proximity signal from a vehicle system. The proximity signal indicates that the vehicle system is approaching a location of the communication device. The sensor assembly also includes a sensor configured to be activated responsive to receiving the proximity signal and to sense one or more characteristics of the vehicle system as the vehicle system moves by the sensor assembly. The sensor assembly includes an off-board controller configured to direct the communication device to communicate a sensor signal that represents the one or more characteristics of the vehicle system. The off-board controller is configured to direct the communication device to communicate the sensor signal to one or more of an onboard controller of the vehicle system or an off-board system to automatically change movement of the vehicle system based on the one or more characteristics of the vehicle system.

In one embodiment, a system includes an onboard communication device configured to communicate a proximity signal from a vehicle system to an off-board sensor assembly responsive to determining that the vehicle system is approaching a location of the sensor assembly. The proximity signal activates the sensor assembly. The onboard communication device is configured to receive a sensor signal from the sensor assembly. The sensor signal represents one or more characteristics of the vehicle system sensed by the sensor assembly as the vehicle system moved by the sensor assembly. The system includes an onboard controller configured to automatically change movement of the vehicle system based on the one or more characteristics of the vehicle system responsive to receiving the sensor signal.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
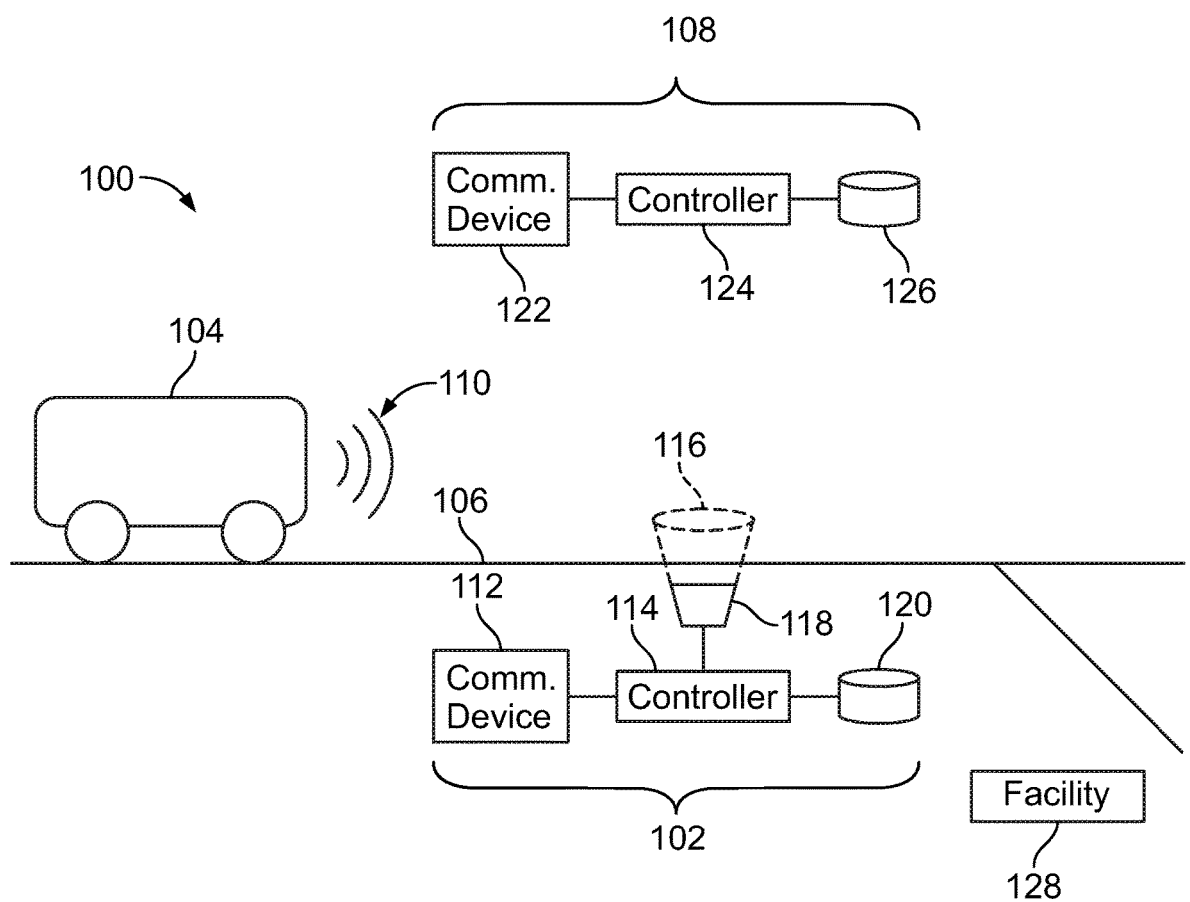
FIG. 1 schematically illustrates one example of a vehicle control system.

Embodiments of the subject matter described herein relate to vehicle control systems and methods that detect issues with vehicle systems and report the issues to control or modify operation of the vehicle systems. In one embodiment, the vehicle control system can be a rail vehicle control system that includes one or more sensor assemblies, such as wayside defect detectors. The sensor assemblies can include hot box detectors, wheel flat spot detectors, or the like.

A vehicle system approaching a sensor assembly can communicate a proximity signal to the sensor assembly. This signal notifies the sensor assembly that the vehicle system will be coming within a sensing distance of the sensor assembly. The sensor assembly activates (e.g., turns on, begins supplying power to, begins monitoring output from, etc.) a sensor that measures, detects, or otherwise senses one or more characteristics of the vehicle system, the route, and/or the environment as the vehicle system passes the sensor.

The sensor assembly determines whether the sensed characteristic(s) indicate an issue with the vehicle system. For example, the sensor assembly can determine whether an axle is too hot, whether a wheel has a flat spot, or the like. Responsive to identifying such an issue, the sensor assembly communicates a sensor signal to one or more locations external to the sensor assembly. The sensor signal may be a digital signal and not a radio signal in one embodiment. The sensor assembly can communicate the sensor signal to a vehicle controller. This onboard controller can change operation of the vehicle system responsive to receiving the sensor signal, such as by preventing the vehicle system from moving faster than a designated speed threshold. This speed threshold may be slower than a maximum permitted speed limit of the route, slower than a speed at which the vehicle system is capable of moving, and/or slower than a speed at which the vehicle system otherwise could move at the current location using a highest throttle setting of the vehicle system. In one example, the onboard controller can be an onboard computer that is used in a positive train control system. The sensor assembly optionally can communicate the sensor signal to an off-board controller, such as a back-office server of the positive train control system. This server can use the sensor signal to issue speed restrictions and/or schedule repair, inspection, or maintenance for the vehicle system.

While some embodiments described herein relate to rail vehicle systems, positive train control systems, and wayside sensors, not all embodiments of the inventive subject matter are restricted to rail vehicles, positive train control systems, or wayside sensors. One or more embodiments of the inventive subject matter may relate to other types or models of vehicle systems, such as automobiles, trucks, buses, mining vehicles, marine vessels, aircraft (manned or unmanned, such as drones), agricultural vehicles, or other off-highway vehicles. One or more embodiments may relate to control systems that control operation of vehicles other than positive train control systems. At least one embodiment relates to sensor assemblies that are not stationary wayside devices or systems.

FIG. 1 schematically illustrates one example of a vehicle control system 100. The control system includes one or more sensor assemblies 102 that measure, detect, or otherwise sense one or more characteristics of vehicle systems 104. The vehicle systems can be rail vehicle systems, but optionally can be automobiles, trucks, buses, mining vehicles, marine vessels, aircraft, agricultural vehicles, or other off-highway vehicles. The illustrated vehicle system includes a single vehicle, but optionally can be formed from two or more vehicles that travel together (by being mechanically coupled or by being mechanically separate but communicating with each other to travel together, such as in a convoy). The vehicle system travels along routes 106, such as tracks, roads, highways, land-based paths, airborne paths, waterways, or the like.

The sensor assembly can be stationary alongside a route, such as a wayside assembly. Alternatively, the sensor assembly can be mobile. For example, the sensor assembly can be disposed onboard an unmanned aircraft (e.g., drone) for moving and measuring characteristics of vehicle systems over several different locations. Optionally, the sensor assembly can be disposed onboard another vehicle system. For example, the sensor assembly can be disposed onboard a first vehicle system and can measure a characteristic of a separate, second vehicle system as the first vehicle system and the second vehicle system travel by or near each other. While only a single sensor assembly is shown, the vehicle control system may include several sensor assemblies.

The vehicle control system also can include a protection system 108. The protection system can be an off-board system that controls where vehicle systems are allowed to travel by issuing (e.g., communicating) signals (e.g., bulletins) to the vehicle systems. In one example, protection system can be a positive vehicle control system that communicates signals with the vehicle systems to notify the vehicle systems where the vehicle systems are allowed to travel, how fast the vehicle systems are allowed to travel, or the like. Onboard components of the vehicle systems (e.g., onboard controllers, described herein) can prevent the vehicle systems from entering into a segment of a route unless a signal is received from the positive vehicle control system that indicates the vehicle systems can travel onto that segment. One example of a positive vehicle control system is a positive train control (PTC) system. In one embodiment, the positive vehicle control system represents a back-office server of a positive train control system. But, not all embodiments of the inventive subject matter described and claimed herein are limited to PTC systems or rail vehicles. Instead, at least one embodiment is directed to a positive vehicle control system that restricts movements of vehicle systems other than rail vehicles.

Another example of a protection system can be a negative vehicle control system. A negative vehicle control system can communicate signals with the vehicle systems to notify the vehicle systems where the vehicle systems are not allowed to travel, how fast the vehicle systems are allowed to travel, or the like. Onboard components of the vehicle systems (e.g., onboard controllers, described herein) can allow the vehicle systems to travel into a segment of a route unless a signal is received from the negative vehicle control system that indicates the vehicle systems cannot travel onto that segment. Another example of a protection system can be a non-signal based system that restricts where and/or how the vehicle system moves without receiving signals from off-board the vehicle system. For example, a manually actuated brake onboard a vehicle system can be a protection system.

In operation, the sensor assembly receives a proximity signal 110 from the vehicle system. This proximity signal may be wirelessly broadcast or transmitted by the vehicle system. For example, the proximity signal can be repeatedly communicated as a beacon signal to any sensor assemblies within a designated distance, such as within the wireless communication range of a communication device that sends the proximity signal. As another example, the proximity signal can be communicated to the sensor assembly based on a known location of the sensor assembly and a location of the vehicle system. Locations of sensors assemblies can be stored in a tangible and non-transitory computer-readable storage medium (e.g., a computer memory) onboard or otherwise accessible by the vehicle system. The vehicle system can send the proximity signal responsive to determining that the vehicle system is approaching (e.g., within a designated distance, such as three kilometers) the sensor assembly.

The sensor assembly includes a communication device 112 that represents hardware circuitry that can communicate data signals via one or more wired and/or wireless pathways. The communication device can represent transceiving circuitry, one or more antennas, modems, or the like. The communication device can receive and provide the proximity signal to a controller 114 of the sensor assembly. The controller of the sensor assembly can be referred to as a sensor controller. The sensor controller represents hardware circuitry that includes and/or is connected with one or more processors that perform the operations of the sensor controller described herein.

The proximity signal is a notification to the sensor controller indicating that the vehicle system is approaching the sensor assembly or otherwise will be within a sensing volume or area 116 of the sensor assembly. The sensing volume or area is a location or locations in which one or more characteristics of the vehicle system can be measured, detected, or otherwise sensed by the sensor assembly. For example, the sensing volume or area can represent a distance that a sensor 118 of the sensor assembly can read, detect, measure, or sense a characteristic of the vehicle system, a wireless communication distance of the sensor, a field of view of the sensor, or the like.

In one embodiment, the sensor may be activated by the sensor controller responsive to receiving the proximity signal. The sensor may be turned off, not powered, not supplied with power, or otherwise inactive prior to being activated by the sensor controller. The sensor controller can turn the sensor on or otherwise activate the sensor prior to arrival of the vehicle system so that the sensor is not continuously on or powered. Alternatively, the sensor may be continuously on or powered such that the sensor controller need not activate the sensor for an approaching vehicle.

The sensor can detect, measure, or otherwise sense one or more characteristics of the vehicle system as the vehicle system is within the sensing area or volume of the sensor. As one example, the sensor can include a hot box detector that measures temperature(s) of the vehicle system. For example, the sensor can measure temperatures of wheels, axles, bearings, or other components of the vehicle system. Elevated temperatures measured by the sensor can indicate that a wheel or axle is not freely rotating and may be at least partially stuck. Another example of the sensor is a wheel flat spot detector that determines whether one or more wheels of the vehicle system have a flat spot. Detected flat spots can indicate that the wheel needs repair or replacement. The sensor can represent an optical sensor, such as a camera, that outputs images and/or video of the vehicle system. For example, the sensor can generate images and/or videos of parts of the vehicle system that are examined by the sensor controller to identify the vehicle system, to identify damage or other issues with the vehicle system, or the like. In one example, the sensor can be a traffic camera that obtains images and/or videos of vehicular congestion on the route. These images and/or videos also may be examined by the sensor controller to identify the vehicle system and/or damage to the vehicle system. The images and/or video can be obtained to examine exhaust plumes of the vehicle system, to determine whether wheels of an aircraft are up or down, to verify the angle of an aircraft nose relative to a horizon, to determine the elevation of an aircraft, or the like.

The sensor can include a weight sensor that measures a size (e.g., mass and/or weight) of the vehicle system. The weight of the vehicle system can indicate whether the vehicle system is carrying more or less cargo than stated in a manifest, whether the vehicle is carrying passengers, or the like. Additionally, the weight of the vehicle system can be used by one or more of the controller described herein to determine a distance needed to safely slow or stop movement of the vehicle system. The sensor can include an infrared sensor that can detect passage of the vehicle system, that can count the number of vehicles in the vehicle system, that can determine the length of the vehicle system based on passing of the leading and trailing ends of the vehicle system, etc. The sensor can include a radio frequency identification reader that scans radio frequency identification tags of the vehicle system to identify the vehicle system, vehicles in the vehicle system, and/or cargo carried by the vehicle system.

The sensor can be an accelerometer that measures vibrations or other movements caused by movement of the vehicle system. The sensor can be a radar system that measures a time-of-flight to the vehicle system. This can be used to determine a size of the vehicle system, such as a length of the vehicle system (by identifying changes in the time-of-flight, the leading and trailing ends of the vehicle system can be identified), the number of vehicles in the vehicle system (changes in the time-of-flight can indicate passage of different vehicles), or the like. The sensor can be a lidar system that measures changes in a structured light array. Changes in reflection of the lights in the structured light array can be used to identify the shape of the vehicle system, the size of the vehicle system, the number of vehicles in the vehicle system, or the like.

Optionally, the sensor can include an audible sensor (e.g., a microphone, piezoelectric element, etc.) that senses sounds generated by movement of the vehicle system. These sounds can indicate issues or problems with the vehicle system, damage to the route, or the like. The sensor can detect sounds of squeals, knocking, vibrations, or the like, as the vehicle system moves along the route. For example, the sensor can include an acoustic bearing defect detection sensor that detects sounds indicative of defects in bearings (e.g., squeals), a dragging equipment sensor that detects sounds indicative of components of the vehicle system dragging along the route or side of the route, etc.

The sensor optionally can measure one or more characteristics of the route and/or environment. For example, the sensor can examine the route to determine whether the route is damaged (e.g., by injecting electric signals into conductive portions of the route to determine whether the route is broken). The sensor can measure temperatures, wind speed and/or direction, humidity, emissions in the air, or the like, of the environment outside of the vehicle system.

As described above, the sensor and/or sensor assembly can be mobile. For example, the sensor can be a mobile beacon that moves or is moveable between different locations. The mobile beacon can repeatedly output a signal that is received by the vehicle system and may be responded to with a responsive signal that includes information on the state or condition of the vehicle system. For example, the mobile beacon may query the vehicle system to determine a software or database version used by the vehicle system. The sensor assembly may be mobile in that the sensor assembly is temporarily stationary to examine vehicle systems but is then moved to another location. Optionally, the sensor or sensor assembly can be handheld devices that can be carried by a person and used to examine the vehicle system. The sensor may be disposed onboard another vehicle system that examines the vehicle system that sent the proximity signal as the vehicle systems pass each other (or at least one of the vehicle systems passes the other vehicle system).

The sensor controller can store characteristic(s) measured by the sensor in a tangible and non-transitory computer-readable storage medium (e.g., memory 120), such as a computer hard drive, optical disc, server, or the like. The characteristics can be stored for later examination (e.g., accident reconstruction analysis), to identify trends or other changes in the characteristics over time, etc.

The sensor controller can examine the characteristic(s) and determine whether to send a signal to the protection vehicle control system and/or the vehicle system. For example, the sensor controller can determine whether the measured characteristic exceeds a threshold, falls below a threshold, is outside of a designated range, is within a designated range, or the like. Based on this examination, the sensor controller may determine that a sensor signal needs to be communicated to change operation of the vehicle system. For example, the sensor controller can examine a measured temperature to determine whether the temperature exceeds a designated temperature. The sensor controller can determine whether a flat spot in the wheel was detected. The sensor controller can determine whether the images and/or videos indicate damage to the vehicle system. Or, the sensor controller can determine whether a measured weight is greater than a threshold weight. Optionally, the sensor controller can examine the characteristic that is measured in another way to determine whether to send a signal.

In one embodiment, the sensor controller can determine whether a measured axle or wheel temperature exceeds a threshold and/or whether a flat spot in a wheel is detected. If the temperature exceeds the threshold or a flat spot is detected, the sensor controller can direct the communication device of the sensor assembly to send a sensor signal. Optionally, another measured characteristic may cause the sensor controller to direct the communication device to send the sensor signal.

The sensor signal can be communicated to the vehicle system and/or the protection vehicle control system. The sensor signal can direct a change in one or more operations of the vehicle system and/or another vehicle system. For example, the sensor signal can be communicated to the vehicle system, which restricts movement of the vehicle system in response to receiving the sensor signal. The vehicle system can change an upper or maximum speed limit that the vehicle system is allowed to travel. This speed limit may be slower than a speed limit of the route and/or slower than a speed that the vehicle system is capable of moving. The vehicle system may be allowed to change speeds (and even increase speed) so long as the vehicle system does not move faster than the reduced speed limit implemented in response to receipt of the sensor signal. As another example, the vehicle system may automatically (e.g., implement without operator intervention) slow or stop movement in response to receiving the sensor signal. The response of the vehicle system to receipt of the sensor signal is automatic in one embodiment to ensure that the sensor signal is not missed.

Optionally, the sensor signal may direct the vehicle system that was examined to implement one or more other changes to operation of the vehicle system. For example, the sensor signal can direct the vehicle system to increase speed, to change a gear of the vehicle system, to change a rotating speed of an axle of the vehicle system, to engage a brake or braking system of the vehicle system, to change an engine speed of the vehicle system, to change an onboard source of electric energy of the vehicle system, to activate a light of the vehicle system, to generate an audible sound onboard the vehicle system, or the like.

The sensor signal can be communicated to the protection vehicle control system to control or change operation of the vehicle system that was examined and/or one or more other vehicle systems. The off-board protection vehicle control system includes a communication device 122 that receives the sensor signal from the communication device of the sensor assembly. The communication device of the protection vehicle control system may include the same or similar components as the other communication devices described herein. The protection vehicle control system also can include a controller 124, referred to herein as an off-board controller or a protection vehicle control system controller. The off-board controller can represent hardware circuitry that includes and/or is connected with one or more processors that perform operations of the protection vehicle control system. The off-board controller can examine the sensor signal received from the sensor assembly implement one or more responsive actions. As one example, the off-board controller can issue one or more speed restrictions. The speed restriction can be a designation of one or more segments of the routes in which vehicle systems are not allowed to move faster than a designated speed limit (which is slower than the speed limit of the route and/or than the vehicle systems are capable of moving). The off-board controller can identify the location of the sensor assembly based on information included in the sensor signal. For example, an identity of the sensor assembly can be included in the sensor signal. A memory 126 of the protection vehicle control system can store locations of the sensor assemblies with identities of the sensor assemblies. The off-board controller can determine the location of the sensor assembly (and the approximate location of the vehicle system that was examined by the sensor assembly) by referring to this information in the memory. Optionally, the sensor signal may include the location of the sensor assembly. The off-board controller can communicate movement authorities, speed restrictions, or the like, to reduce the speed of the vehicle system that was examined and/or other vehicle systems in the area(s) near the vehicle system that was examined. The movement authorities, speed restrictions, etc. can be communicated from the off-board controller to the vehicle systems via the communication device of the protection vehicle control system.

As another example, the off-board controller can change which route a vehicle system travels along responsive to receiving the sensor signal. With respect to the vehicle system that was examined, the off-board controller can send a control signal to the vehicle system, to a switch, to a signal, or to another device that controls which route(s) the vehicle system travels. The off-board controller can change which route the vehicle system travels on to direct the vehicle system toward a repair facility 128 for inspection, repair, or to replace one or more vehicles in the vehicle system, to direct the vehicle system away or out of a congested area (e.g., an area having more vehicular and/or pedestrian traffic than the area to where the vehicle system is directed), or the like. Optionally, the off-board controller can direct the vehicle system to change which lane the vehicle system is traveling in on a multi-lane route responsive to receiving the sensor signal. For example, the off-board controller can direct the vehicle system to move to a lane having slower moving traffic, toward a lane that will provide an easier or quicker exit from the route, or the like. Optionally, the off-board controller can order maintenance, inspection, or repair of the route responsive to receiving the sensor signal. For example, the sensed characteristic may indicate that the route is damaged or potentially in need of inspection or repair. The off-board controller can send a request to personnel to inspect, repair, or otherwise maintain the route based on or responsive to the sensor signal.

In an embodiment where the protection vehicle control system is or includes a back-office server of a positive train control system, the off-board controller can generate or change a movement authority, a movement bulletin, or a movement schedule for at least one other vehicle system responsive to receiving the sensor signal. The movement authority, bulletin, or schedule can prevent the other vehicle system from traveling into a route segment or block, such as the segment or block where the vehicle system that was examined is or will be located or stopped. For example, the positive train control system can selectively issue a signal to one or more vehicle systems to prevent those vehicle systems from approaching a vehicle system found to have one or more measured characteristics that are out of tolerance.

With respect to a positive train control system as the protection vehicle control system, the vehicle system may include onboard components that communicate with the positive train control system. These components may limit movement of the vehicle system based on movement authorities, bulletins, etc., that are issued by the back office server (e.g., the off-board controller) of the positive train control system (e.g., the protection vehicle control system). Different back office servers may be associated with different areas in which the movement authorities, bulletins, etc. are issued. For example, each back office server of several back office servers may issue movement authorities, bulletins, or the like, for the vehicle systems traveling in an area associated with that back office server, but not for the vehicle systems traveling in an area associated with another back office server.

Communication with different back office servers may require onboard components of the vehicle system to have different versions of software, different communication protocols, or the like. A vehicle system having a software version or communication protocol that can communicate with the back office server associated with route segments in one area may not be the correct version or protocol for communicating with another back office server associated with route segments in another area. The vehicle system may need to update or change the software version or communication protocol before entering into and/or traveling within the other area.

The characteristic that is determined by the sensor assembly can include the software version, communication protocol, and/or database content of onboard components of the positive train control system. For example, the sensor can wirelessly communicate with onboard components of the vehicle system to determine the version of software running onboard the vehicle system (that communicates with the off-board controller). As another example, the sensor can communicate with onboard components of the vehicle system to determine the communication protocol used by the onboard components to communicate with the off-board controller. As another example, the sensor can communicate with onboard components of the vehicle system to determine the contents of a database (e.g., memory) onboard the vehicle system. The sensor controller can determine whether any of these characteristics indicates that the vehicle system is able to communicate with a back office server (e.g., the off-board controller) or whether a software version change, a change in communication protocol, and/or a modification of the information stored onboard the vehicle system is needed before the vehicle system can communicate with the off-board controller.

If the sensor controller determines that a change in software, communication protocol, and/or database is needed, then the sensor controller can direct the communication device of the sensor assembly to communicate the sensor signal to the vehicle system and/or the back office server. This sensor signal can include the software change, communication protocol change, and/or database change, or can direct the vehicle system to obtain the software, protocol, and/or database change. This can ensure that the vehicle system has the correct or proper software version, communication protocol, and/or database content for entering into and/or traveling within an area associated with a back office server of a positive train control system.

Figure 2:
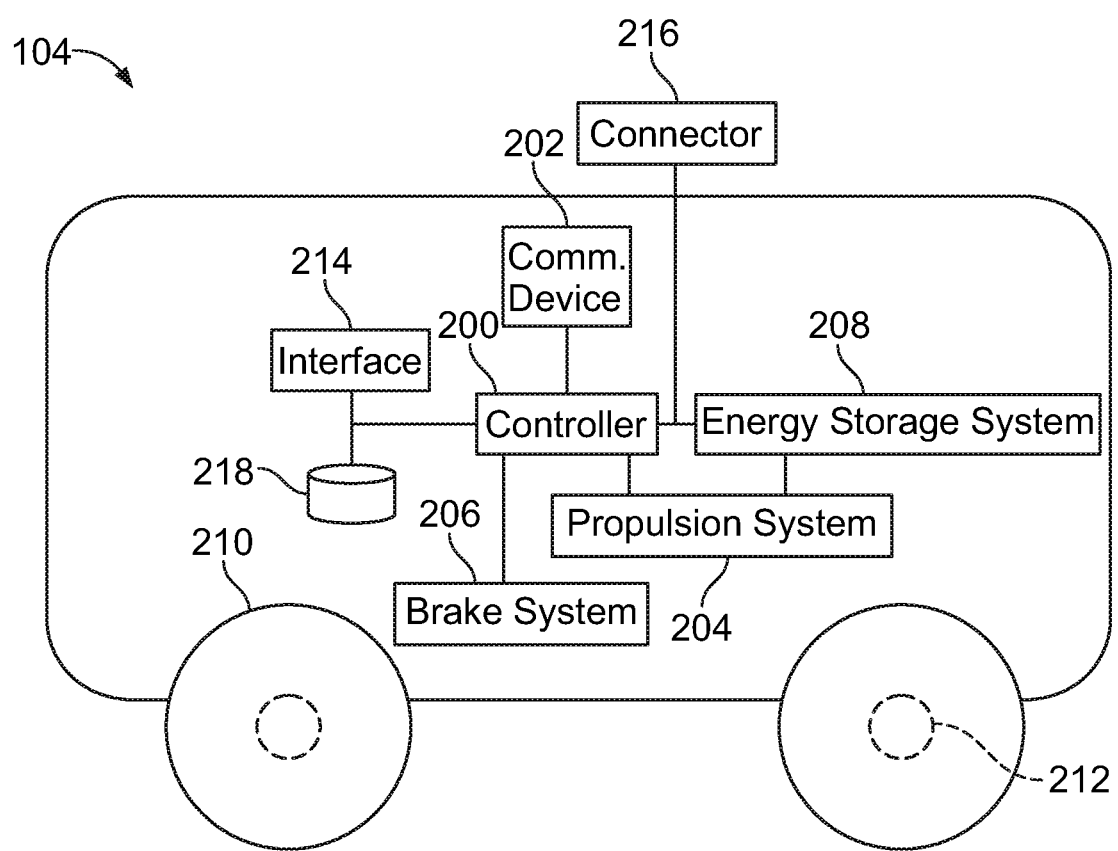
FIG. 2 schematically illustrates one example of the vehicle system shown in FIG. 1.

FIG. 2 schematically illustrates one example of the vehicle system 104 shown in FIG. 1. The vehicle system includes a controller 200, which can be referred to as the onboard controller. The onboard controller can represent hardware circuitry that includes and/or is connected with one or more processors that perform operations described in connection with the onboard controller. The onboard controller can communicate with onboard and/or off-board components via a communication device 202, which may be the same as or similar to the other communication devices described herein. For example, the communication device onboard the vehicle system may wirelessly communicate with the communication device(s) of the protection vehicle control system and/or the sensor assembly.

The vehicle system includes a propulsion system 204 that operates to move the vehicle system along the routes. The propulsion system can represent one or more engines, motors, transmissions, propellers, or the like, that generate propulsion to move the vehicle system. The vehicle system also can include a brake system 206 that operates to slow or stop movement of the vehicle system. The brake system can include air brakes, friction brakes, motors (e.g., used for dynamic or regenerative braking), or the like. The onboard controller can communicate control signals with the propulsion system and/or brake system to control or change movement of the vehicle system, as described herein.

The vehicle system can include an onboard energy storage system 208 that includes one or more devices that store and/or generate electric current. This current can be used to power components onboard the vehicle system, such as the propulsion system. Optionally, the energy storage system may include or represent one or more motors of the propulsion system and/or brake system (where the motors generate current during regenerative braking). The energy storage system can include one or more batteries, fuel cells, photovoltaic devices, flywheels, alternators, generators, or the like. The onboard controller can communicate control signals to the energy storage system to control supply of current to one or more components of the vehicle system.

As described above, the onboard controller can change operation of the vehicle system responsive to receiving the sensor signal from the sensor assembly and/or a signal from the protection vehicle control system. For example, the controller can communicate with the propulsion system and/or the brake system to slow or stop movement of the vehicle system, to increase speed of the vehicle system, to change gears of a transmission of the propulsion system, to change how quickly an axle 210 and/or wheels 212 of the vehicle system rotate (which may be different than a moving speed of the vehicle system due to wheel slip), to change a speed at which an engine of the propulsion system operates, or the like. The onboard controller may change one or more of these operations responsive to receiving the signal and, optionally, without operator intervention or confirmation.

Alternatively, the onboard controller can receive the signal from the sensor assembly and/or protection vehicle control system and present a notification to an operator onboard the vehicle system to change an operation of the vehicle system. For example, the onboard controller can direct a display device of an operator interface 214 to display instructions or a warning to the operator on how to change operation of the vehicle system, can direct a speaker of the interface to audibly present the instructions or warning, or the like. The operator may then manually implement the change, such as by providing input to the onboard controller, the propulsion system, the brake system, etc. The operator interface can represent electronic displays, speakers, touchscreens, or the like. Optionally, the onboard controller can direct the operator interface to activate a light, generate a sound (e.g., an alarm), or the like.

The onboard controller can change a source of power for the vehicle system based on the sensor signal. For example, the energy storage system may have multiple storage devices (e.g., batteries, battery cells, fuel cells, etc.) that store current. Responsive to receiving the sensor signal, the onboard controller can change which battery, battery cell, fuel cell, or the like, is used to power components of the vehicle system. Optionally, the vehicle system may include a connector 216 that can couple with an off-board power source. This connector can be a pantograph that engages a powered catenary, a conductive brush or shoe that engages an electrified rail, a cable that connects with a power grid, or the like, to receive current from an off-board power source. The onboard controller can switch from the propulsion system being powered from current supplied from an onboard source of current (e.g., the energy storage system, an alternator, a generator, etc.) to current supplied from an off-board source using the connector responsive to receipt of the sensor signal or a signal from the protection vehicle control system (or vice-versa). For example, the sensor signal may indicate a fault or other problem with one source of power and the onboard controller can switch to another source of power in response to receiving the sensor signal.

As described above, the onboard controller may have a tangible and non-transitory computer-readable storage medium (e.g., a memory 218), such as a computer hard drive, server, optical disk, or the like, that stores information used for controlling movement of the vehicle system. This memory can store a route database having information on the location and/or layout of routes, locations of sensor assemblies, locations of protection vehicle control systems, trip manifests, or the like. The memory can store software programs and/or communication protocols used to communicate with the protection vehicle control system. The sensor assembly can determine that the software version, communication protocol, and/or database contents are not correct or configured for communication with a protection vehicle control system associated with an upcoming area that the vehicle system is traveling toward. The sensor controller and/or off-board controller can communicate an update to the software, protocol, and/or database in the memory onboard the vehicle system responsive to the sensor determining that the software, protocol, and/or database contents cannot be used to communicate with the upcoming protection vehicle control system.

The memory of the vehicle system can store locations of the sensor assemblies. The onboard controller can refer to these locations in the memory to determine whether the vehicle system is approaching (e.g., heading toward and within a designated distance of) a sensor assembly. The onboard controller can direct the communication device of the vehicle system to send the proximity signal to the sensor assembly responsive to the vehicle system approaching within the designated distance of the sensor assembly to activate the sensor of the sensor assembly, as described above.

Figure 3:
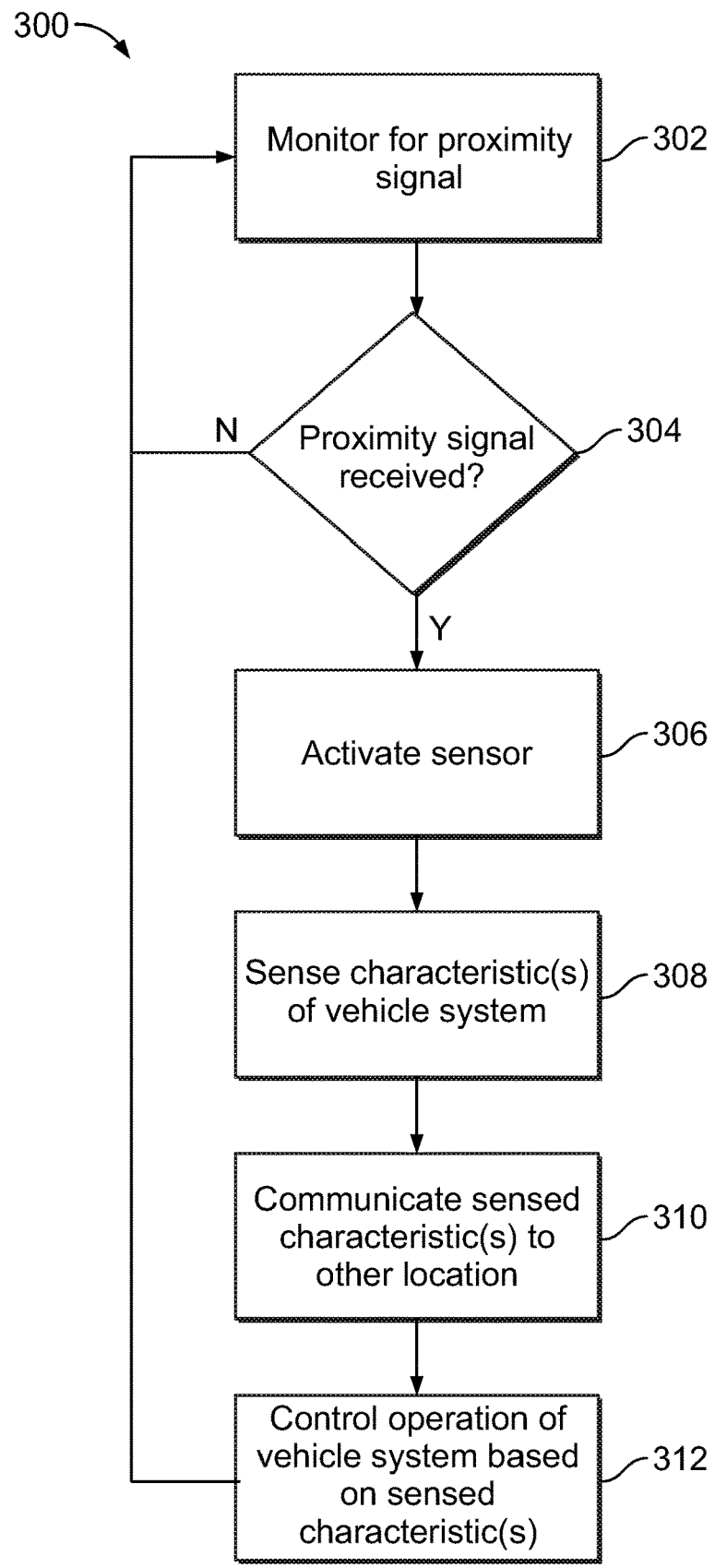
FIG. 3 illustrates a flowchart of one example of a method for controlling operation of a vehicle system.

FIG. 3 illustrates a flowchart of one example of a method 300 for controlling operation of a vehicle system. The method can represent operations performed by the sensor assembly, the protection vehicle control system, and/or the onboard controller described above. At 302, a communication device monitors for a proximity signal. For example, the communication device of the sensor assembly may be a passive device that is powered by receipt of the electromagnetic waves in the proximity signal sent by the communication device of the vehicle system. Alternatively, the communication device of the sensor assembly may be an active device that repeatedly listens for receipt of a proximity signal.

At 304, a determination is made as to whether a proximity signal is received. For example, the sensor controller can determine whether the communication device of the sensor assembly received a proximity signal from an approaching vehicle system. If a proximity signal was received, then the sensor controller may need to activate the sensor to measure, detect, or otherwise sense one or more characteristics of the approaching vehicle system. As a result, flow of the method 300 can proceed toward 306. If no proximity signal was received, the sensor controller may not activate the sensor. This can prevent the sensor from measuring characteristics that are not representative of a passing vehicle system. This can avoid false-positive detections of failures, damage, or other issues by the sensor assembly. Flow of the method 300 can return toward 302 or optionally may terminate.

At 306, the sensor of the sensor assembly is activated. The sensor can be activated by the sensor controller turning the sensor on via a switch or by otherwise directing power to the sensor. At 308, one or more characteristics of the vehicle system are sensed by the sensor. As described above, a variety of various characteristics can be measured or detected by the sensor. At 310, the sensed characteristic or characteristics are sent to another location. This other location can be the vehicle system, another vehicle system, and/or the protection vehicle control system described above. At 312, operation of the vehicle system or another vehicle system is controlled based on the sensed characteristic or characteristics, as described above.

In one embodiment, a method (e.g., for controlling a vehicle system) is provided that includes receiving a proximity signal at a sensor assembly from the vehicle system. The proximity signal indicates that the vehicle system is approaching a location of the sensor assembly. The method also includes activating a sensor of the sensor assembly responsive to receiving the proximity signal, sensing one or more characteristics of the vehicle system as the vehicle system moves by the sensor assembly, and communicating a sensor signal that represents the one or more characteristics of the vehicle system that are sensed. The sensor signal is communicated to one or more of an onboard controller of the vehicle system and/or an off-board system to control operation of the vehicle system based on the one or more characteristics of the vehicle system.

Optionally, the sensor signal can be communicated to control the operation of the vehicle system without operator intervention of the vehicle system. The operation of the vehicle system can be controlled by one or more of increasing a speed of the vehicle system, slowing down the vehicle system, changing a gear of the vehicle system, changing a rotating speed of an axle of the vehicle system, engaging a braking system of the vehicle system, changing an engine speed of the vehicle system, changing an onboard source of electric energy of the vehicle system, activating a light of the vehicle system, and/or generating an audible sound onboard the vehicle system.

The sensor assembly can be a wayside device that senses the one or more characteristics of the vehicle system as the vehicle system passes by the wayside device. Optionally, the sensor assembly can be a mobile device that senses the one or more characteristics of the vehicle system as the vehicle system moves relative to the mobile device.

The one or more characteristics of the vehicle system that are sensed can include one or more of a temperature of an axle of the vehicle system, a temperature of a bearing of the vehicle system, a temperature of a wheel of the vehicle system, a flat spot on the wheel of the vehicle system, a sound of the bearing of the vehicle system, and/or a sound of a component of the vehicle system dragging on a route. The one or more characteristics of the vehicle system that are sensed can include image data of the vehicle system as generated by the sensor.

The one or more characteristics of the vehicle system that are sensed can include one or more of a software version of a communication device onboard the vehicle system, a communication protocol used by the communication device, and/or a content of a database onboard the vehicle system and used for controlling movement of the vehicle system. The method optionally also can include communicating one or more of a software update and/or a database update to the vehicle system based on the one or more characteristics of the vehicle system that are sensed.

The sensor signal can be communicated to an off-board system to one or more of automatically restrict movement of the vehicle system, automatically restrict movement of at least one other vehicle system, change which route the vehicle system is traveling along, change which lane of a plurality of lanes in a route the vehicle system is traveling along, order maintenance, inspection, or repair of the vehicle system, and/or order maintenance, inspection, or repair of the route.

Optionally, the sensor signal is communicated to an onboard positive train control (PTC) system controller located onboard the vehicle for reducing an upper restriction on a moving speed of the vehicle system as dictated by the PTC system controller. Not all embodiments, however, are restricted to PTC systems or rail vehicles.

The sensor signal can be communicated to an off-board back office system to one or more of generate or change a movement authority for at least one other vehicle system, generate or change a movement bulletin for the at least one other vehicle system, generate or change a movement schedule of the at least one other vehicle system, and/or direct a maintenance system to repair, inspect, or maintain a block of a route.

In one embodiment, a system (e.g., a vehicle control system) includes a controller configured to be disposed onboard a vehicle system and to receive one or more characteristics of the vehicle system from a sensor assembly. The sensor assembly is configured to sense the one or more characteristics of the vehicle system as the vehicle system approaches a location of the vehicle system. The controller is configured to control operation of the vehicle system based on one or more characteristics of the vehicle system.

Optionally, the controller can be communicated to control the operation of the vehicle system without operator intervention of the vehicle system. The operation of the vehicle system controlled by the controller one or more of increasing a speed of the vehicle system, slowing down the vehicle system, changing a gear of the vehicle system, changing a rotating speed of an axle of the vehicle system, engaging a braking system of the vehicle system, changing an engine speed of the vehicle system, changing an onboard source of electric energy of the vehicle system, activating a light of the vehicle system, and/or generating an audible sound onboard the vehicle system.

The one or more characteristics of the vehicle system that are received by the controller can include one or more of a temperature of an axle of the vehicle system, a temperature of a bearing of the vehicle system, a temperature of a wheel of the vehicle system, a flat spot on the wheel of the vehicle system, a sound of the bearing of the vehicle system, or a sound of a component of the vehicle system dragging on a route.

Optionally, the controller can be configured to receive one or more of a software update and/or a database update to the vehicle system based on the one or more characteristics of the vehicle system that are sensed.

In one embodiment, a sensor assembly includes a communication device configured to receive a proximity signal from a vehicle system. The proximity signal indicates that the vehicle system is approaching a location of the communication device. The sensor assembly also includes a sensor configured to be activated responsive to receiving the proximity signal and to sense one or more characteristics of the vehicle system as the vehicle system moves by the sensor assembly. The sensor assembly includes an off-board controller configured to direct the communication device to communicate a sensor signal that represents the one or more characteristics of the vehicle system. The off-board controller is configured to direct the communication device to communicate the sensor signal to one or more of an onboard controller of the vehicle system or an off-board system to automatically change movement of the vehicle system based on the one or more characteristics of the vehicle system.

Optionally, the communication device, the sensor, and the off-board controller can be included in a wayside device that senses the one or more characteristics of the vehicle system as the vehicle system passes by the wayside device. The communication device, the sensor, and the off-board controller can be included in a mobile device that senses the one or more characteristics of the vehicle system as the vehicle system moves relative to the mobile device.

The sensor can include one or more of a temperature sensor, an accelerometer, and/or an acoustic sensor. The sensor can include an optical sensing device. The sensor can be configured to sense the one or more characteristics by communicating with an onboard controller of the vehicle system to determine one or more of a software version of an onboard communication device of the vehicle system, a communication protocol used by the onboard communication device, and/or a content of an onboard database of the vehicle system and used for controlling movement of the vehicle system.

Optionally, the off-board controller can be configured to communicate one or more of a software update or a database update to the onboard controller of the vehicle system based on the one or more characteristics of the vehicle system that are sensed. The communication device can be configured to communicate the sensor signal to an off-board system to one or more of restrict movement of the vehicle system, restrict movement of at least one other vehicle system, change which route the vehicle system is traveling along, order maintenance, inspection, or repair of the vehicle system, and/or order maintenance, inspection, or repair of the route.

The communication device can be configured to communicate the sensor signal to an onboard positive train control (PTC) system controller located onboard the vehicle for reducing an upper restriction on a moving speed of the vehicle system as dictated by the PTC system controller. Optionally, the communication device can be configured to communicate the sensor signal to an off-board back office system of a PTC system for the back office system to one or more of generate or change a movement authority for at least one other vehicle system, generate or change a movement bulletin for the at least one other vehicle system, generate or change a movement schedule of the at least one other vehicle system, and/or direct a maintenance system to repair, inspect, or maintain a block of a route.

In one embodiment, a system includes an onboard communication device configured to communicate a proximity signal from a vehicle system to an off-board sensor assembly responsive to determining that the vehicle system is approaching a location of the sensor assembly. The proximity signal activates the sensor assembly. The onboard communication device is configured to receive a sensor signal from the sensor assembly. The sensor signal represents one or more characteristics of the vehicle system sensed by the sensor assembly as the vehicle system moved by the sensor assembly. The system includes an onboard controller configured to automatically change movement of the vehicle system based on the one or more characteristics of the vehicle system responsive to receiving the sensor signal.

Optionally, the controller can be communicated to change the movement of the vehicle system without operator intervention of the vehicle system. The one or more characteristics of the vehicle system that are sensed can include one or more of a temperature of an axle of the vehicle system, a temperature of a bearing of the vehicle system, a temperature of a wheel of the vehicle system, a flat spot on the wheel of the vehicle system, a sound of the bearing of the vehicle system, and/or a sound of a component of the vehicle system dragging on a route. The one or more characteristics of the vehicle system that are sensed can include one or more of a software version of a communication device onboard the vehicle system, a communication protocol used by the communication device, and/or a content of a database onboard the vehicle system and used for controlling movement of the vehicle system. The onboard controller can be configured to change the movement of the vehicle system by selectively reducing an upper restriction on a moving speed of the vehicle system.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related.

Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   receiving a proximity signal at an off-board sensor assembly from an onboard communication device of a vehicle system, the proximity signal indicating that the vehicle system is approaching a location of the sensor assembly;
   activating a sensor of the sensor assembly responsive to receiving the proximity signal;
   sensing one or more characteristics of the vehicle system as the vehicle system moves by the sensor assembly; and
   directing, using an off-board controller, an off-board communication device to communicate a sensor signal that represents the one or more characteristics of the vehicle system that are sensed, the sensor signal communicated to one or more of an onboard controller of the vehicle system or an off-board system to control operation of the vehicle system based on the one or more characteristics of the vehicle system.

2. The method of claim 1, wherein the sensor signal is communicated to control the operation of the vehicle system without operator intervention of the vehicle system, the operation of the vehicle system controlled by one or more of increasing a speed of the vehicle system, slowing down the vehicle system, changing a gear of the vehicle system, changing a rotating speed of an axle of the vehicle system, engaging a braking system of the vehicle system, changing an engine speed of the vehicle system, changing an onboard source of electric energy of the vehicle system, activating a light of the vehicle system, or generating an audible sound onboard the vehicle system.

3. The method of claim 1, wherein the sensor assembly is a wayside device that senses the one or more characteristics of the vehicle system as the vehicle system passes by the wayside device.

4. The method of claim 1, wherein the sensor assembly is a mobile device that senses the one or more characteristics of the vehicle system as the vehicle system moves relative to the mobile device.

5. The method of claim 1, wherein the one or more characteristics of the vehicle system that are sensed include one or more of a temperature of an axle of the vehicle system, a temperature of a bearing of the vehicle system, a temperature of a wheel of the vehicle system, a flat spot on the wheel of the vehicle system, a sound of the bearing of the vehicle system, or a sound of a component of the vehicle system dragging on a route.

6. The method of claim 1, wherein the one or more characteristics of the vehicle system that are sensed include image data of the vehicle system as generated by the sensor.

7. The method of claim 1, wherein the one or more characteristics of the vehicle system that are sensed include one or more of a software version of a communication device onboard the vehicle system, a communication protocol used by the communication device, or a content of a database onboard the vehicle system and used for controlling operation of the vehicle system.

8. The method of claim 7, further comprising communicating one or more of a software update or a database update to the vehicle system based on the one or more characteristics of the vehicle system that are sensed.

9. The method of claim 1, wherein the sensor signal is communicated to an off-board system to one or more of:
automatically restrict movement of the vehicle system,
automatically restrict movement of at least one other vehicle system,
change which route the vehicle system is traveling along,
change which lane of a plurality of lanes in a route the vehicle system is traveling along,
order maintenance, inspection, or repair of the vehicle system, or
order maintenance, inspection, or repair of the route.

10. The method of claim 1, wherein the sensor signal is communicated to an onboard positive train control (PTC) system controller located onboard the vehicle for reducing an upper restriction on a moving speed of the vehicle system as dictated by the PTC system controller.

11. The method of claim 1, wherein the sensor signal is communicated to an off-board back office system to one or more of:
generate or change a movement authority for at least one other vehicle system,
generate or change a movement bulletin for the at least one other vehicle system,
generate or change a movement schedule of the at least one other vehicle system, or
direct a maintenance system to repair, inspect, or maintain a block of a route.

12. A system comprising:
an onboard controller configured to be disposed onboard a vehicle system, to direct an onboard communication device of the vehicle system to communicate a proximity signal to an off-board sensor assembly, and to receive a sensor signal indicating one or more characteristics of the vehicle system from the sensor assembly responsive to an off-board communication device of the sensor assembly receiving the proximity signal from the vehicle system, the sensor assembly having an off-board controller configured to activate a sensor of the sensor assembly to sense the one or more characteristics of the vehicle system responsive to the sensor assembly receiving the proximity signal and as the vehicle system approaches a location of the sensor assembly, the onboard controller configured to control operation of the vehicle system based on one or more characteristics of the vehicle system.

13. The system of claim 12, wherein the onboard controller is communicated to control the operation of the vehicle system without operator intervention of the vehicle system, the operation of the vehicle system controlled by the onboard controller one or more of increasing a speed of the vehicle system, slowing down the vehicle system, changing a gear of the vehicle system, changing a rotating speed of an axle of the vehicle system, engaging a braking system of the vehicle system, changing an engine speed of the vehicle system, changing an onboard source of electric energy of the vehicle system, activating a light of the vehicle system, or generating an audible sound onboard the vehicle system.

14. The system of claim 12, wherein the one or more characteristics of the vehicle system that are received by the onboard controller include one or more of a temperature of an axle of the vehicle system, a temperature of a bearing of the vehicle system, a temperature of a wheel of the vehicle system, a flat spot on the wheel of the vehicle system, a sound of the bearing of the vehicle system, or a sound of a component of the vehicle system dragging on a route.

15. The system of claim 14, wherein the onboard controller is configured to receive one or more of a software update or a database update to the vehicle system based on the one or more characteristics of the vehicle system that are sensed.

16. A sensor assembly comprising:
a communication device configured to receive a proximity signal from a vehicle system, the proximity signal indicating that the vehicle system is approaching a location of the communication device;
a sensor configured to be activated responsive to receiving the proximity signal and to sense one or more characteristics of the vehicle system as the vehicle system moves by the sensor assembly; and
an off-board controller configured to direct the communication device to communicate a sensor signal that represents the one or more characteristics of the vehicle system, the off-board controller configured to direct the communication device to communicate the sensor signal to one or more of an onboard controller of the vehicle system or an off-board system to automatically change operation of the vehicle system based on the one or more characteristics of the vehicle system.

17. The assembly of claim 16, wherein the communication device, the sensor, and the off-board controller are included in a wayside device that senses the one or more characteristics of the vehicle system as the vehicle system passes by the wayside device.

18. The assembly of claim 16, wherein the communication device, the sensor, and the off-board controller are included in a mobile device that senses the one or more characteristics of the vehicle system as the vehicle system moves relative to the mobile device.

19. The assembly of claim 16, wherein the sensor includes one or more of a temperature sensor, an accelerometer, or an acoustic sensor.

20. The assembly of claim 16, wherein the sensor includes an optical sensing device.

21. The assembly of claim 16, wherein the sensor is configured to sense the one or more characteristics by communicating with an onboard controller of the vehicle system to determine one or more of a software version of an onboard communication device of the vehicle system, a communication protocol used by the onboard communication device, or a content of an onboard database of the vehicle system and used for controlling movement of the vehicle system.

22. The assembly of claim 21, wherein the off-board controller is configured to communicate one or more of a software update or a database update to the onboard controller of the vehicle system based on the one or more characteristics of the vehicle system that are sensed.

23. The assembly of claim 16, wherein the communication device is configured to communicate the sensor signal to an off-board system to one or more of:
- restrict movement of the vehicle system,
- restrict movement of at least one other vehicle system,
- change which route the vehicle system is traveling along,
- order maintenance, inspection, or repair of the vehicle system, or
- order maintenance, inspection, or repair of the route.

24. The assembly of claim 16, wherein the communication device is configured to communicate the sensor signal to an onboard positive train control (PTC) system controller located onboard the vehicle for reducing an upper restriction on a moving speed of the vehicle system as dictated by the PTC system controller.

25. The assembly of claim 16, wherein the communication device is configured to communicate the sensor signal to an off-board back office system of a positive train control (PTC) system for the back office system to one or more of:
- generate or change a movement authority for at least one other vehicle system,
- generate or change a movement bulletin for the at least one other vehicle system,
- generate or change a movement schedule of the at least one other vehicle system, or
- direct a maintenance system to repair, inspect, or maintain a block of a route.

26. A system comprising:
- an onboard communication device configured to communicate a proximity signal from a vehicle system to an off-board sensor assembly responsive to determining that the vehicle system is approaching a location of the sensor assembly, the proximity signal activating the sensor assembly, the onboard communication device configured to receive a sensor signal from the sensor assembly, the sensor signal representing one or more characteristics of the vehicle system sensed by the sensor assembly as the vehicle system moved by the sensor assembly; and
- an onboard controller configured to automatically change operation of the vehicle system based on the one or more characteristics of the vehicle system responsive to receiving the sensor signal.

27. The system of claim 26, wherein the controller is communicated to change the operation of the vehicle system without operator intervention of the vehicle system.

28. The system of claim 26, wherein the one or more characteristics of the vehicle system that are sensed include one or more of a temperature of an axle of the vehicle system, a temperature of a bearing of the vehicle system, a temperature of a wheel of the vehicle system, a flat spot on the wheel of the vehicle system, a sound of the bearing of the vehicle system, or a sound of a component of the vehicle system dragging on a route.

29. The system of claim 26, wherein the one or more characteristics of the vehicle system that are sensed include one or more of a software version of a communication device onboard the vehicle system, a communication protocol used by the communication device, or a content of a database onboard the vehicle system and used for controlling movement of the vehicle system.

30. The system of claim 26, wherein the onboard controller is configured to change the movement of the vehicle system by selectively reducing an upper restriction on a moving speed of the vehicle system.

* * * * *